T. GILMORE, Jr.
DISINTEGRATING MACHINE.
APPLICATION FILED MAR. 5, 1920.
1,396,108.
Patented Nov. 8, 1921.
4 SHEETS—SHEET 4.
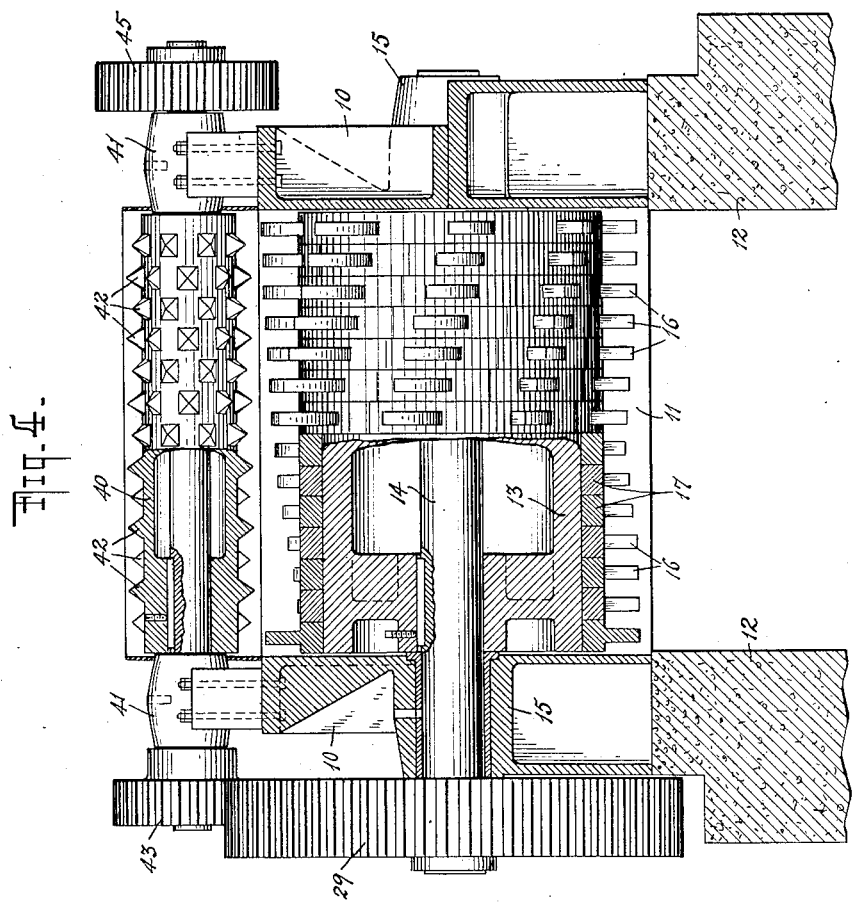
WITNESSES
INVENTOR
Thomas Gilmore Jr.
BY
ATTORNEYS

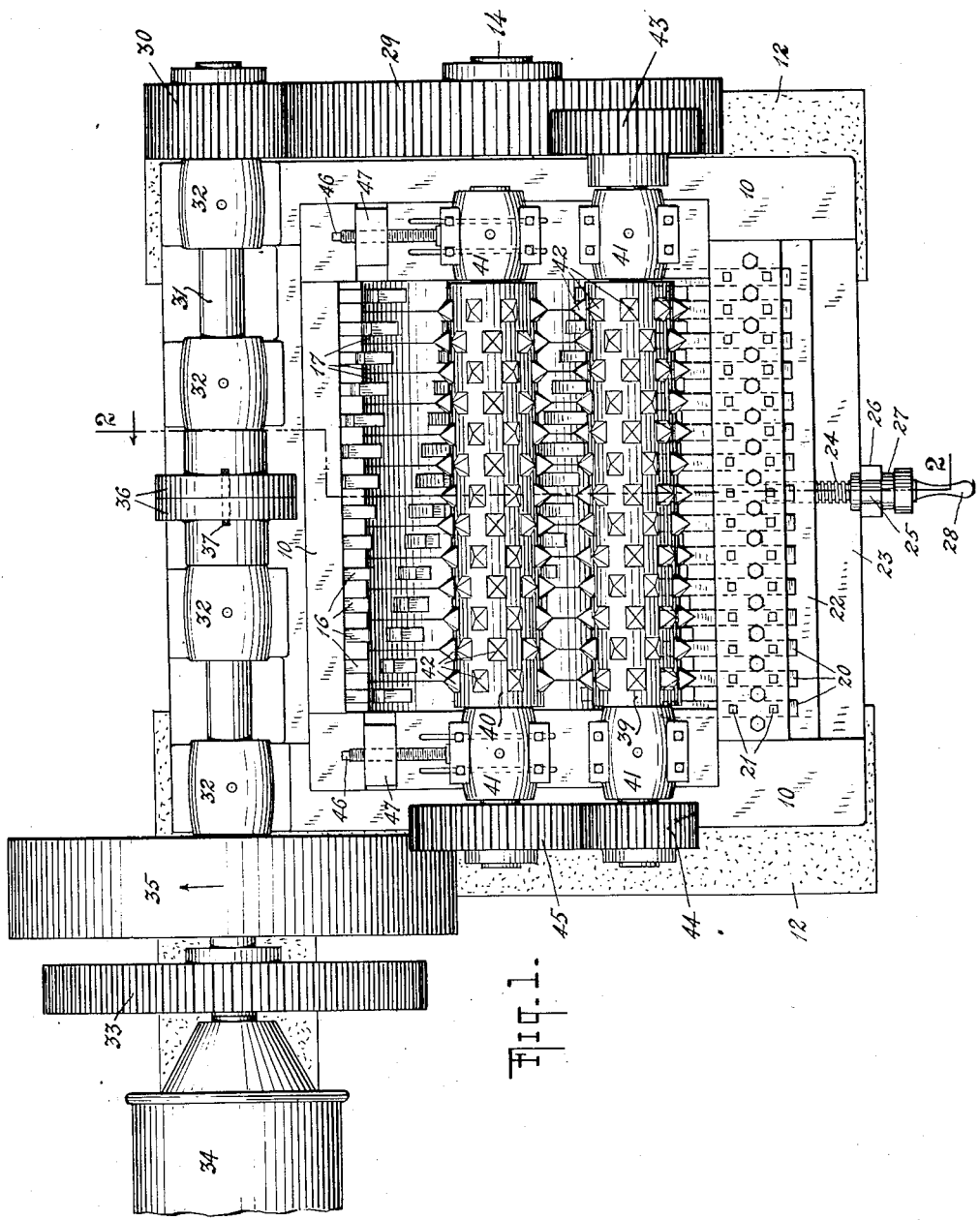

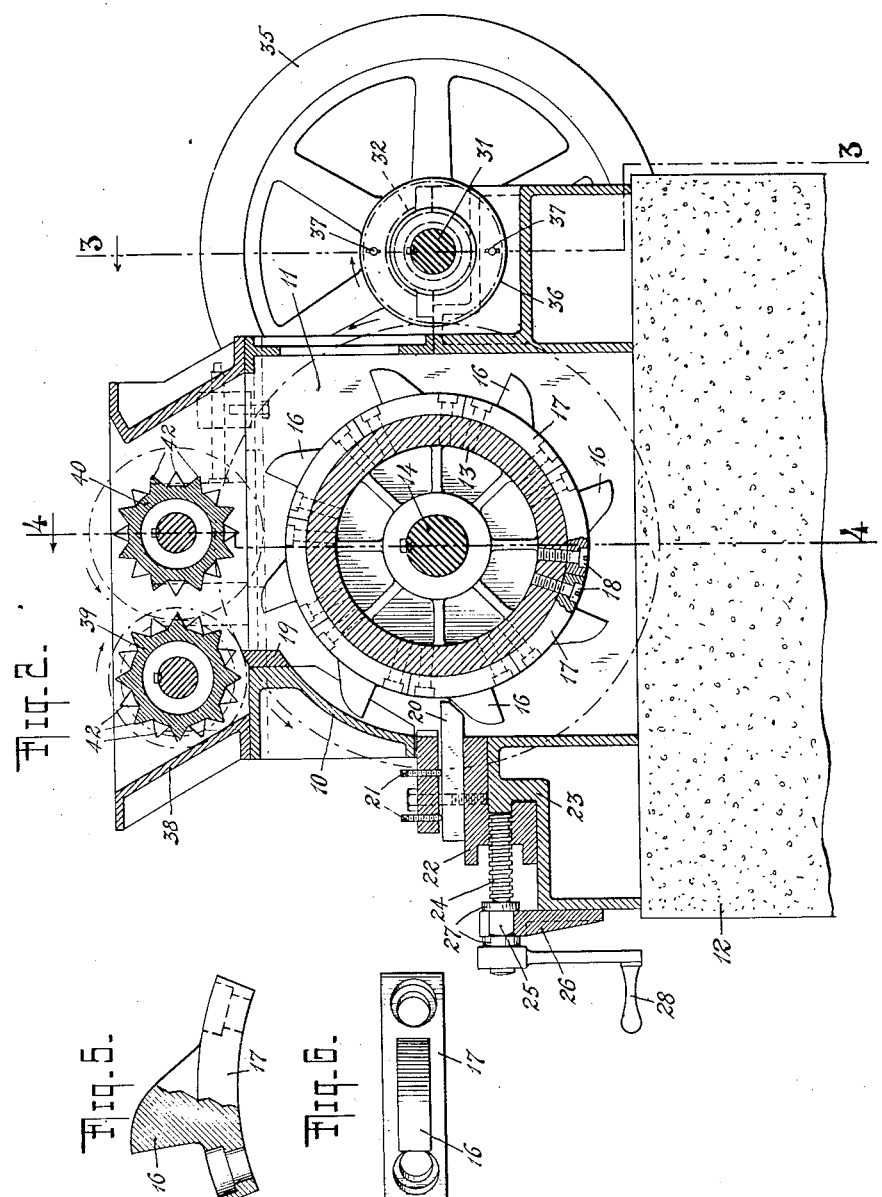

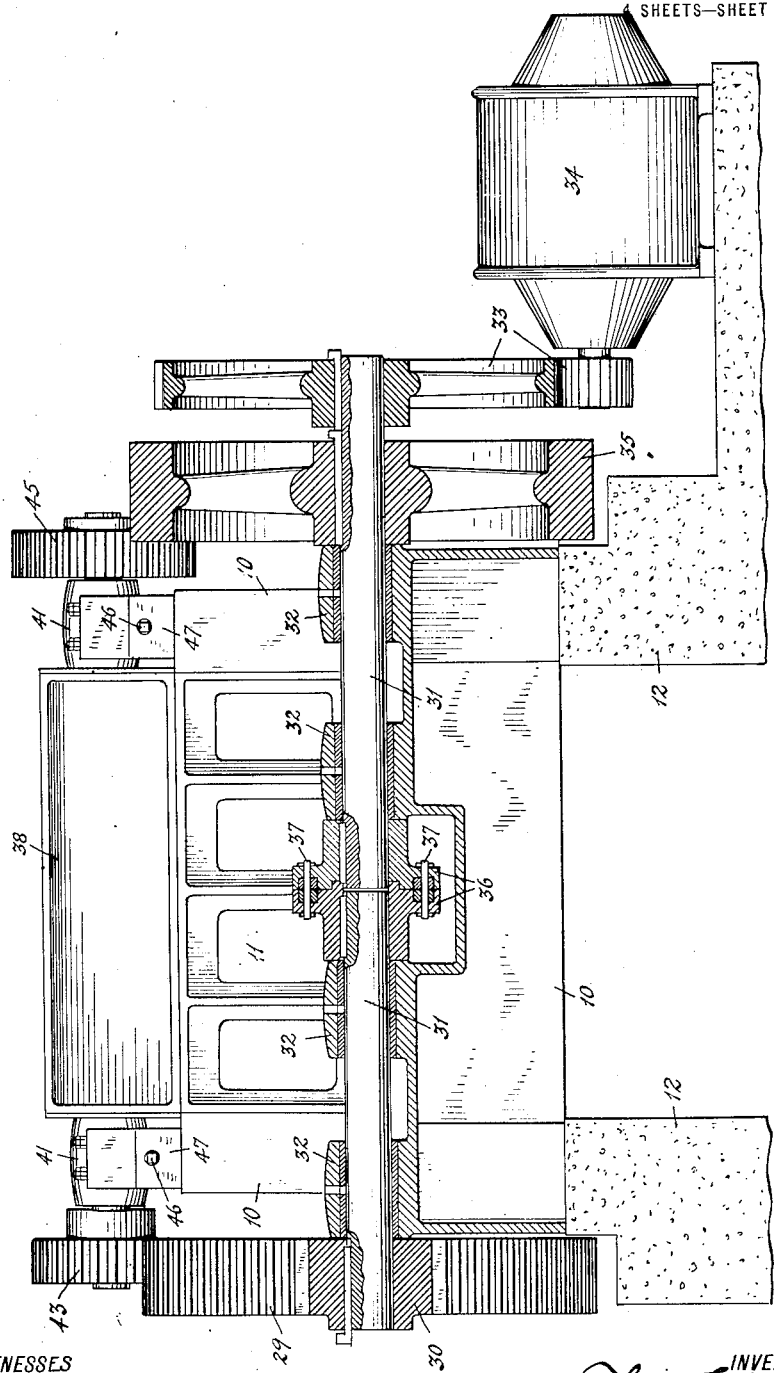

UNITED STATES PATENT OFFICE.

THOMAS GILMORE, JR., OF BROOKLYN, NEW YORK, ASSIGNOR TO GENERAL BRIQUETTING COMPANY, OF NEW YORK, N. Y., A CORPORATION OF MAINE.

DISINTEGRATING-MACHINE.

1,396,108.        Specification of Letters Patent.       Patented Nov. 8, 1921.

Application filed March 5, 1920. Serial No. 363,521.

*To all whom it may concern:*

Be it known that I, THOMAS GILMORE, Jr., a citizen of the United States, and resident of the borough of Brooklyn, county of Kings, city and State of New York, have made certain new and useful Improvements in Disintegrating-Machines, of which the following is a specification.

My invention relates to disintegrating machines and has for its object to provide a simple machine whereby metal cuttings and the like are disintegrated or shredded in an efficient and economical manner, to render them available, for instance for briqueting purposes. Other more specific objects of my invention will appear from the description hereinafter and the features of novelty will be pointed out in the appended claim.

In the accompanying drawings, which illustrate a specific embodiment of my invention without defining the limits thereof, Figure 1 is a plan view of the machine; Fig. 2 is a sectional view thereof on the line 2—2 of Fig. 1; Fig. 3 is a sectional view on the line 3—3 of Fig. 2; Fig. 4 is an elevation partly in section, those parts which are in section being cut approximately on the line 4—4 of Fig. 2, and Figs. 5 and 6 are detail views of one of the cutters included in the machine.

As shown in the drawings, the machine comprises a casing 10 of suitable dimensions and material, and forming a disintegrating chamber 11 open at the top for the admission of the material to be disintegrated and having an outlet at the bottom through which the material is discharged after it has passed through the machine, said casing 10 being supported upon a suitable foundation or equivalent support 12. A carrier, which in the illustrated example takes the form of a drum 13 is rotatably mounted in the chamber 11 and is carried by a shaft 14 journaled in suitable bearings 15 as shown in Fig. 4. On its periphery the drum 13 is provided with a plurality of cutters, each comprising an active cutting member 16 preferably constituting an integral part of and projecting upwardly from a base 17 shaped to fit the drum and having suitable apertures for the accommodation of fastening devices such as bolts 18 whereby said cutters are rigidly secured upon said drum. The cutters 16 in the machine as shown, are arranged in rows which extend circumferentially of the drum, the bases 17 in a given row being in end to end engagement to circumferentially space the cutters 16 to the desired extent as shown in Fig. 4, while the bases in adjacent rows are in edge to edge engagement to properly space the cutters 16 in axial directions. In addition, in the illustrated arrangement the cutters 16 in adjacent rows are located out of registry and preferably are advanced or off-set with respect to each other as shown in Fig. 4, in directions lengthwise of the drum, so that said cutters 16 are located in axial rows which extend spirally of the drum and succesively follow each other as the latter is rotated for the purpose to be more fully described hereinafter. The cutters 16 coöperate with a shearing member 19 located in the chamber 11, at the inlet end thereof, and further pass between and coöperate with the cutting members 20 which are adjustably held by screws 21 in a carriage 22 and together form what may be termed a disintegrating or shredding comb. The cutting members 20 in their normal position, project from the carriage 22, into the chamber 11 and into the path of the cutters 16, it being understood that the latter are in registry with the spaces between the cutting members 20 and successively pass through the same as the drum is actuated.

The carriage 22 in its normal position extends into a space provided for the purpose in the casing 10 and is slidably mounted upon a supporting base 23 which as shown may comprise an integral extension of the casing 10 and is preferably undercut or otherwise constructed to form a recess as indicated in Fig. 2, the carriage 22 being shaped to snugly fit into said recess when in its working position. Any suitable means may be provided for sliding the carriage in directions transverse to the axis of the drum 13, it being understood that the range of movement of said carriage in a direction away from the drum is sufficient to bring the cutting members 20 completely out of the chamber 11 into ready accessibility for the purpose to be more fully set forth hereinafter. In the illustrated example the adjusting means in question comprises a screw 24 having a screw-threaded engagement with a convenient portion of the carriage 22 and forming an integral extension of a short shaft 25 journaled in a bearing 26 and provided with annular flanges 27 located upon opposite sides of said bearing to prevent axial movement of said shaft 25 and screw 24 relatively thereto. A crank handle 28 or other equivalent device may be provided upon the shaft 25 for manipulating the same and for rotating the screw 24 when it is desired to shift the carriage 22 and cutting members 20. After having been adjusted to its proper working position the carriage 22 is securely locked in place against vibration because of its snug fit into the previously mentioned recess of the base and may further be fastened in any suitable manner as by means of suitable set screws or the like.

The drum or carrier 13, in the illustrated example, is rotatably driven by means of a gear 29 secured upon the shaft 14 and meshing with a pinion 30 carried by a driving shaft 31 journaled in suitable bearings 32. The shaft 31 may through the medium of suitable gearing 33, be in direct driving connection with the driving shaft of an electric motor 34 as shown, or it may be coupled directly to said motor shaft, or said shaft 31 may be belt driven by means of a suitable pulley 35. In the preferred construction, the driving shaft 31 is made in two axially alining sections operatively connected together by means of a suitable clutch 36 which will permit that section of said shaft to which power is applied to rotate relatively to the other section, for instance, in case resistance to the rotation of the drum 13 develops in the machine. This is of advantage if the machine becomes internally clogged from any cause and prevents the destruction and injury to the elements thereof, particularly the cutters and cutting members.

In the illustrated example the two members of the clutch 36 are connected to rotate in unison by means of pins 37. If from any cause, resistance to the rotation of the drum 13 is developed, the rotative force exerted by the one clutch member on that section of the shaft 31 to which power is applied, will sheer off these pins 37 and thus permit said shaft section to rotate freely relatively to the other section of said shaft. The clutch members are again operatively connected by the insertion of the new pins 37. This arrangement is only an example and may be replaced by other devices producing equivalent results.

An auxiliary casing 38 rests upon the casing 10 and is suitably secured thereto in registry with the inlet opening thereof as shown in Fig. 2 and in turn may support a suitable hopper the latter however being optional and being omitted in some cases. A pair of parallel and spaced rollers 39 and 40 are located in the auxiliary casing 37 above the drum 13 and are journaled in suitable bearings 41, said rollers being provided on their surfaces with spurs or teeth 42 preferably arranged in staggered relation as shown. The shaft of the roller 39 at one end carries a gear 43 which meshes with the gear 29 and at its other end carries a gear 44 which meshes with a gear 45 located upon the shaft of the roller 40. The arrangement of gears is such that the rollers 39 and 40 are driven at different speeds, the gears 44 and 45 in an actual machine being dimensioned for instance to drive the roller 39 at one hundred and forty revolutions per minute while the roller 40 is driven at ninety-six revolutions per minute, this, of course, being only an example and not an arbitrary ratio. Suitable adjusting screws 46 having screw-threaded connection with bearings 47 and being operatively connected with the bearings 41 may be provided for adjusting the position of either or both of the rollers 39 and 40 over the drum 13, it being understood that the gears 44 and 45 and possibly also the gear 43 are replaced by others of proper size to meet the change in adjustment of said rollers. As shown in the drawing said rollers are preferably so positioned with respect to the drum 13 as to bring the space between the rollers to one side of the axis of said drum and preferably on that side thereof toward the shearing member 19.

In operation power is applied to rotate the driving shaft 31 which through the medium of the pinion 30 and gear 29 transmits its motion to the drum 13 and at the same time causes a rotation of the rollers 39 and 40 by means of the gears 43, 44 and 45, the relative dimensions of the latter two gears being such as to rotate the two rolls at different speeds as before stated. As the drum 13 is rotated the cutters 16 pass the shearing member 19 in operative relation thereto and then pass between the cutting members 20 also in operative relation thereto, it being understood with the illustrated arrangement, the cutters 16 travel in rotative succession as it were.

The machine is specially adapted for disintegrating the metal cuttings, which result for instance from lathe work and the like and which generally speaking are in the form of coils and spirals of varying dimensions and as such are incapable of being satisfactorily and economically used for briqueting purposes.

This material is placed in the hopper above the auxiliary casing 38 or if the hopper is not included in the machine, is manually disposed upon the rollers 39 and 40 and in either case, through the medium of the spurs or teeth 42 is drawn down between said rollers and finally deposited upon the drum 13. Because of the fact that the rollers 39 and 40 are driven at different speeds, the feed of the material between the same and to the drum is carried on without interruption and with maximum efficiency.

In addition to this, the difference in speed causes the rollers 39 and 40, through the medium of the spurs or teeth 42, to tear the material apart as it passes therebetween, this being particularly true when relatively large bundles of material are fed into the machine. The said material is thus partially disintegrated and broken down before it reaches the drum 13.

By changing the driving gears and by adjusting the shaft centers accordingly, the speed of the rollers 39 and 40 may be varied to meet any existing conditions. This adjustability of the shaft centers also makes it possible to increase or decrease the distance between said rollers to meet the requirements of existing working conditions and the material being operated upon. Though the rollers 39 and 40, in the illustrated example, are provided with diamond shaped spurs 42 it will be understood that spurs of other designs and shapes more satisfactory for certain kinds of material may be substituted, this being determined for instance by experience. After the material reaches the drum 13 it is carried along thereby and by the coöperative action of the cutters 16 and shearing member 19 is further disintegrated or shredded and passes beyond the shearing member 19 to the shredding comb composed of the cutting members 20. Through the coöperative action of the latter and the cutters 16 the disintegrating or shredding of said material is completed at this point, it being understood that said material generally does not pass said shredding comb until it has been properly acted upon by the cutters 16 and cutting members 20. After having been thus finally shredded or disintegrated the material is in the form of small sections of metal, the original cuttings having either been simply reduced in dimensions and separated into smaller sections, or having their original physical forms completely changed, this depending somewhat upon the characteristics of the original cuttings both as to size and shape and the action of the cutting means thereon. In any case, the material after having been acted upon by the machine, is admirably adapted for briqueting purposes and passes through the outlet of the casing 10 either into suitable receptacles or to points readily accessible for the collection of said material.

Because of the fact that the cutters 16 are always arranged in off-set relation to each other upon the carrier 13 or its equivalent, said cutters, in the operation of the machine, reach the shearing member 19 and the cutting members 20 in predetermined sequence dependent in each case upon the specific arrangement of said cutters. Thus in the illustrated form said cutters 16 are located in predetermined groups extending lengthwise of the drum 13 and as the latter is actuated, come into coöperative relation with or reach the shearing member 19, and cutting members 20 or other equivalent cutting means in a number which is always less than the full number of cutters 16 in a given group. Specifically expressed, with respect to the machine illustrated, said cutters are moved successively into coöperative relation with the cutting means constituted by the shearing member 19 and cutting members 20 or either of these elements; that is to say, the cutters 16 in adjacent rows follow each other into coöperative cutting relation with said cutting means. The coöperative disintegrating action of the various cutting devices is thus developed to a very high degree of efficiency with a minimum strain upon the elements involved.

If the material should develop an obstructive force either at the shearing member 19 or at the cutting members 20 or at both places, to the rotation of the drum 13 or an obstruction to said movement is otherwise developed, the clutch 36, by permitting a relative rotative movement of the two sections of the driving shaft 31 as described, will prevent injury to the vital elements of the machine, which may thus be stopped to permit the obstruction to be removed.

If the obstruction force develops at the cutting member 20, the latter may be readily moved out of the chamber 11 into a position of ready accessibility by rotating the screw 24 through the medium of the crank-handle 28 to slidably shift the carriage 22 and to permit the ready removal of whatever is causing the trouble. This shifting of said carriage 22 is also of advantage when it is desired to adjust the cutting members 20 or to replace the same if for any reason this becomes necessary.

The machine is simple in construction and is economical and efficient in operation and requires no specially skilled attention. It will be understood, although the machine is particularly designed for disintegrating metal cuttings for briqueting purposes, that it may be efficiently utilized for other purposes.

Various changes in the specific form shown and described may be made within the scope of the claim without departing from the spirit of my invention.

I claim:

In a disintegrating machine, a rotary disintegrator comprising a drum, a plurality of individual cutters mounted upon said drum in predetermined relation to each other, said cutters each consisting of a base lying in surface engagement with said drum and an integral cutting member projecting from said base, and fastening devices passing through said bases whereby the latter are fixed in abutting engagement with each other to space said cutters apart both circumferentially and longitudinally of said drum and to secure them thereto.

In testimony whereof I have hereunto set my hand.

THOMAS GILMORE, Jr.